United States Patent [19]

Root

[11] Patent Number: 4,628,306
[45] Date of Patent: Dec. 9, 1986

[54] REMOTE CONTROL SYSTEM FOR AUTOMATED EQUIPMENT

[75] Inventor: Robert H. Root, Vermilion, Ohio

[73] Assignee: South Coast Research, Inc., Vermilion, Ohio

[21] Appl. No.: 529,218

[22] Filed: Sep. 6, 1983

[51] Int. Cl.[4] .............................................. H04Q 1/00
[52] U.S. Cl. ........................... 340/825.00; 340/825.23; 340/825.69; 361/182
[58] Field of Search ....................... 307/115; 318/568; 340/825.23, 825.69, 825.72, 825.73, 696, 825, 825.26; 361/182, 183

[56] References Cited

U.S. PATENT DOCUMENTS

| | | | |
|---|---|---|---|
| 2,996,681 | 8/1961 | Marks | 361/182 X |
| 3,648,143 | 3/1972 | Harper et al. | 318/568 |
| 3,686,672 | 8/1972 | Ishizuka | 361/182 |
| 4,378,507 | 3/1983 | Root | 361/182 X |

Primary Examiner—Ulysses Weldon
Attorney, Agent, or Firm—Pearne, Gordon, Sessions, McCoy, Granger & Tilberry

[57] ABSTRACT

A remote control system operates automated equipment, such as a robotic device. The remote control system operates using an RF link and has both a "hard stop" control and a "soft stop" or "cycle hold" control. The system permits the technician or operator to work around a robotic device with the proximity switches deactivated without the necessity of being connected to the main control panel using a pendant device connected by cables.

11 Claims, 4 Drawing Figures

REMOTE CONTROL SYSTEM FOR AUTOMATED EQUIPMENT

BACKGROUND OF THE INVENTION

1. Field of the Invention

This invention relates to the control of automated equipment, and in particular to a control system which operates remote from the master control panel of the automated equipment.

2. Description of the Prior Art

Most automated manufacturing systems are presently equipped with sensing devices which will detect a variety of potentially dangerous operating conditions. Upon detection, an automated system will cease to operate or will retract to a home position as a result of a misplaced workpiece, programming error, or a foreign object entering into the unit's working environment. These sensing devices use a variety of probes, limit switches, and ultrasonic and photoelectric proximity switches. During normal operations, these sensors usually provide adequate protection from most malfunctions.

However, a danger is present when automated equipment, or more specifically a robotic device, is being programmed manually by a technician. Programming may take place by a variety of methods, but in most cases, proximity sensors and switches are deactivated to allow the technician to be in close contact with the robotic device. Programs may be input to the control unit by means of a programming pendant which is connected to the master control panel of the robotic device by a cable. In addition to programming functions, the pendant may possess a "soft stop" or "cycle hold" control function and a "hard stop" control function. These two control functions also usually appear on the master control panel.

The "soft stop" or "cycle hold" is activated when the technician wishes to jog the unit or interrupt the system during normal operations. Upon reactivation of the "soft stop" or "cycle hold", the system will resume the normal operating cycle. The "hard stop" function is only activated when the operator or technician perceives a serious malfunction within the system. Activating the "hard stop" will cause the unit to stop by deactivating the program and disconnecting the power from the various drive functions. In some cases the program will be lost from the memory. Programming methods other than the pendant type exist, but most control units regardless of their design possess these two distinct methods of controlling the systems movement.

Automated systems travel at various speeds depending upon the application. Some systems move as fast as 50 mph. As a result, an individual can be seriously injured if he does not react with the proper response in an emergency situation. If a technician actually carries the control pendant, he possesses the capability to control the unit's operational status. However, the control pendant with its attached cabling is often cumbersome and difficult to carry when the technician is working around the robotic device. The cable sometimes will become entangled in the equipment and the operator may be tempted to leave the pendant behind in order to make it easier to work on the equipment. In addition, the cable may be placed in a position where it can be accidentally damaged or severed by the operation of the equipment. If the programming pendant is not at hand or out of reach, or if the cable connecting the pendant has been damaged or severed, an individual has no method of quickly reacting to a program error or system malfunction.

Existing systems also have a limitation in that the "soft stop" or "cycle hold" may be cyclicable. If this control is activated while the equipment has been stopped or held, the actuation of the control will have the effect of reactivating the equipment so that movement resumes. Thus, if a technician operates the "soft stop" or "cycle hold" to stop the equipment and then inadvertently reactivates the control, the equipment may be inadvertently restarted, and the technician may be seriously injured.

The problem of reactivating the "soft stop" may be overcome by having the "soft stop" control on the pendant capable of only stopping the equipment and not restarting the equipment. However, this requires the technician to leave the equipment area and return to the master control panel to restart the equipment every time it is stopped.

SUMMARY OF THE INVENTION

The present invention provides a remote control system for automated equipment or a robotic device which overcomes the problems of the prior art control systems and provides capabilities and advantages which have not been previously possible. The present invention allows the technician to freely move around the robotic device with the proximity sensors shut down and to control the action of the robotic device in a reliable and safe manner. The remote control system of the present invention operates using an RF link to the master control panel so that the problems of damaged or severed cables and the inconvenience of cable-connected pendants are avoided. When an emergency occurs, the technician can immediately actuate the control system to either activate the "soft stop" control of the unit or the "hard stop" control of the unit depending upon the severity of the situation. Since the remote control device can be carried on the person of the technician or operator, it is extremely unlikely that the technician or operator will inadvertently or carelessly leave the control while working on the robotic device.

The remote control system of the present invention utilizes two RF signals to control both the "hard stop" and the "soft stop" or "cycle hold". Therefore, the operator or technician has the capability of operating either of these functions at any time while working on the robotic device.

The "soft stop" control in the present invention is not normally cyclicable, so that the problem of inadvertent reactivation of the equipment by reactivating the "soft stop" control is avoided. A reset switch is provided on the master control panel of the robotic device so that the "soft stop" or "cycle hold" may be reset and the system made operational again by returning to the master control panel to reactivate the "soft stop". However, in order to make the robotic device easily programmable, the system is also provided with an override switch on the master control panel. When the override switch is activated, the "soft stop" or "cycle hold" is cyclicable and reactivation of the "soft stop" restarts the operation of the robotic device. Thus, the technician or operator can program the equipment in close proximity to the equipment using the remote control system of the present invention and starting and stopping the equipment using the "soft stop" or "cycle hold" control.

The present invention also preferably incorporates a test mode so that both the "soft stop" or "cycle hold" control and the "hard stop" control may be tested without these controls being operational to actually control the equipment. The control system of the present invention is provided with indicator lights on the master control panel to make it easy to determine whether the "hard stop" or the "soft stop" or "cycle hold" control have been activated. Indicator lights are also provided to show whether the control system is in the test mode or the operational mode and to show whether the override switch has been activated to make the "soft stop" control cyclicable.

These and other advantages are provided by the present invention of a remote control system for automated equipment which includes a control unit comprising an RF receiver capable of receiving two different RF signals from a transmitter. The control unit also comprises a momentary contact relay means comprising a first relay operator and first relay contacts. The first relay operator is connected to the receiver to be energized in response to the receipt of one of the two RF signals. The first relay contacts are connected to the hard stop control of the automated equipment. The control unit also comprises a latch relay means comprising a second relay operator and second relay contacts. The second relay operator is connected to the receiver to be energized in response to the receipt of the other of the two RF signals. The second relay contacts are connected to the soft stop control of the automated equipment. The second relay operator is connected to the second relay contacts to disable the second relay operator after it has been energized. The control unit also comprises a reset switch connected to the second relay operator to energize the second relay operator independently of the receiver. An override switch is connected to the second relay operator to permit the second relay operator to be re-energized in response to the receipt of the other of the two RF signals.

Preferably, the control unit also comprises a test switch means for deactivating the automated equipment controls from the first and second relay contacts.

DETAILED DESCRIPTION OF THE PREFERRED EMBODIMENT

Figure 1:
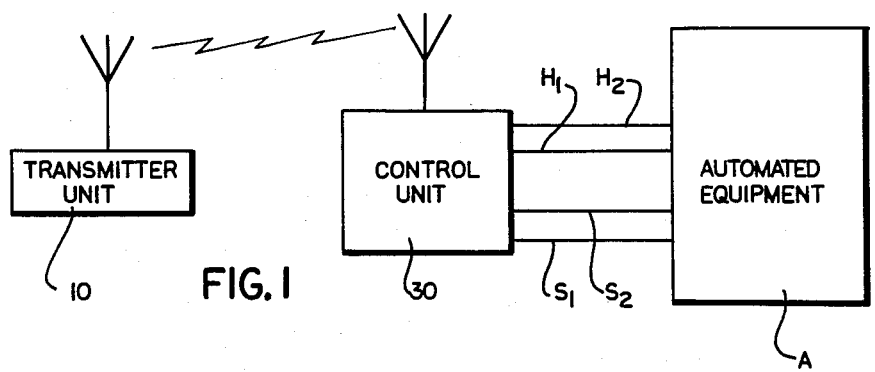
FIG. 1 is a block diagram showing the units of the control system of the present invention.

Referring more particularly to the drawings, FIG. 1 shows the control system of the present invention. The control system comprises a portable transmitter unit 10 and a main control unit 30. The transmitter unit 10 and the control unit 30 are connected to each other by an RF link. The control unit 30 is connected to automated equipment A by lines $H_1$, $H_2$, $S_1$, and $S_2$. The lines $H_1$ and $H_2$ operate the "hard stop" control of the automated equipment, and the lines $S_1$ and $S_2$ operate the "soft stop" or "cycle hold" of the automated equipment.

Figure 2:
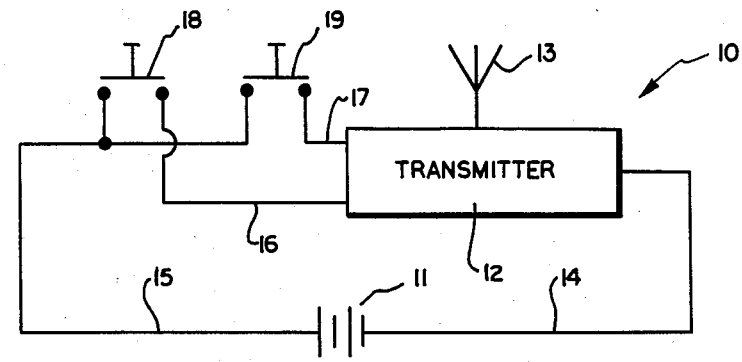
FIG. 2 is an electrical schematic of the remote transmitter unit comprising a portion of the control system of the present invention.

FIG. 2 shows in more detail the portable transmitter unit 10 which is adapted to be carried by the operator or technician. The unit 10 comprises a battery 11 connected to a small portable radio transmitter 12 having an antenna 13. The battery 11 is connected to the transmitter 12 by lines 14, 15, 16 and 17. Between the lines 15 and 16 is a push button switch 18, and between the lines 15 and 17 is another push button switch 19. The transmitter 12 is normally off and is activated by pressing either the button 18 or the button 19 to close the circuit between the battery 11 and the transmitter 12. Upon actuation of either the switch 18 or the switch 19, power is supplied to the transmitter 12, and the transmitter sends an RF signal on a predetermined frequency. The nature of the signal and the frequency depend upon which switch 18 or 19 is activated and whether the transmitter 12 receives power on the line 16 or the line 17. The portable transmitting unit 10 may be enclosed within a plastic case and may include a low battery indicator which will indicate that the power supply in the portable transmitter unit is below a predetermined level and that the battery 11 needs to be replaced or recharged.

Figure 3:
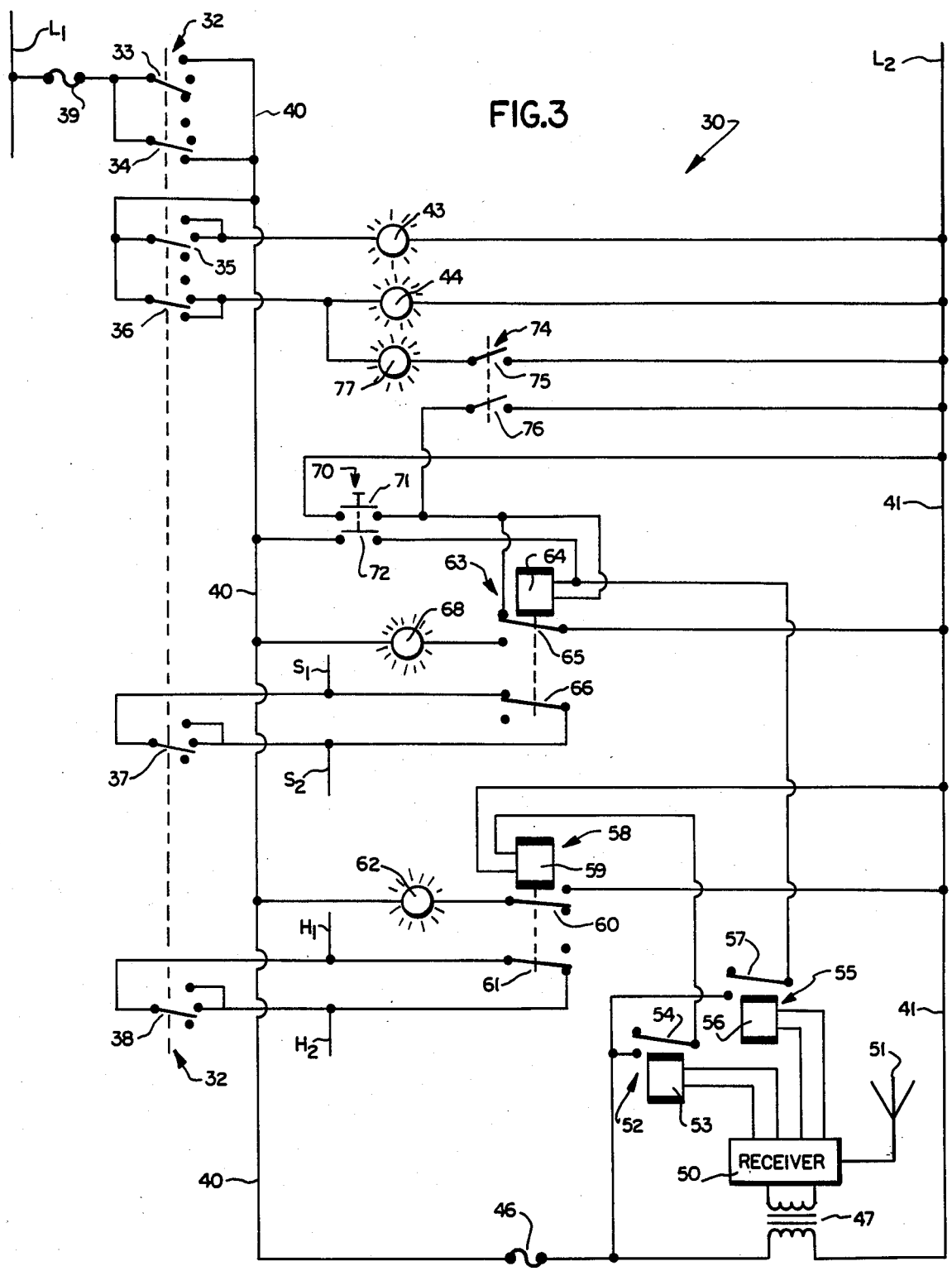
FIG. 3 is an electrical schematic of the main control unit comprising a portion of the control system of the present invention.

FIG. 3 shows in more detail the main control unit 30 comprising a portion of the remote control system of the present invention. The control unit 30 is adapted to be mounted on the master control panel of the automated equipment and to be connected to the "hard stop" control and the "soft stop" or "cycle hold" control of the automated equipment by the lines $H_1$, $H_2$, $S_1$ and $S_2$ as shown in FIG. 1. The control unit 30 of FIG. 3 operates from a conventional power source comprising lines $L_1$ and $L_2$. The lines $L_1$ and $L_2$ typically supply 110-volt, single phase alternating current.

The control unit 30 includes a main selector switch 32 which is a 6-pole 3-position switch which allows the unit to be in one of three operational modes. When the switch 32 is in the "off" mode (the center position of each pole 33–38 as shown in FIG. 3) the receiving unit is deactivated and disconnected from the automated equipment controls. When this switch is moved to the "test" mode (the upper position of each pole 33–38 in FIG. 3), the receiving unit along with its internal switching relays are operational but are disconnected from the automated equipment controls. When the selector switch 32 is moved to the "on" mode (the lower position of each pole 33–38 in FIG. 3) the receiving unit is energized and will interface to operate the automated equipment controls.

The control unit 30 has a first power supply line 40 and a second power supply line 41. The second power supply line 41 is connected directly to the main power supply line $L_2$. The first power supply line 40 is connected to the power supply line $L_1$ through the first and second poles 33 and 34 of the main selector switch 32. A fuse 39 is placed between the poles 33 and 34 of the main selector 32 and the power supply line $L_1$. The first pole 33 connects the main power supply line 40 with the power line $L_1$ when the main selector switch is in the "test" mode. The second pole 34 connects the first power supply line 40 to the power line $L_1$ when the main selector switch 32 is in a "on" mode.

A "test" indicator light 43 is illuminated when the main Cselector switch 32 is in the "test" mode. The test indicator light 43 is connected between the first power supply line 40 in the second power supply line 41. The "test" indicator light 43 is connected to the first power supply 40 through the third pole 35 of the main selector switch 32. The third pole 35 is closed when the main selector switch 32 is in the "off" mode and in the "test" mode and is open when the main selector switch is in the "on" mode, so that the "test" indicator light 43 is only illuminated when the main selector switch 32 is in the "test" mode and the first pole 33 and the third pole 35 are both closed.

An "on" indicator light 44 is illuminated when the main selector switch 32 is in the "on" mode. The "on" indicator light is connected between the first power supply line 40 and the second power supply line 41. The "on" indicator light 44 is connected to the first power supply line 40 through the fourth pole 36 of the main selector switch 32. The fourth pole 36 is closed when the main selector switch 32 is in the "off" mode or the "on" mode. Therefore the "on" indicator light 44 is only illuminated when the main selector switch 32 is in the "on" mode and the second pole 34 and the fourth pole 36 are both closed.

A fuse 46 is installed at one end of the first power supply line 40. A transformer 47 has one side connected to the first power supply line 40 through the fuse 46 and to the second power supply line 41 and has the other side connected to a radio receiver 50 having an antenna 51. The receiver 50 is connected to the transformer 47 which converts the 110 volts AC from the power supply lines $L_1$ and $L_2$ to 24 volts AC which is used to operate the radio receiver 50.

The radio receiver 50 of the type adapted to receive two distinct RF signals on preassigned frequencies. Preferably, the signals sent by the transmitter 12 and received by the receiver 50 are digitally encoded. Such digitally encoded RF signals can be generated by conventional transmitting means and can be selectively sensed by conventional receiving means. By digitally encoding the RF signal, it is less likely that extraneous signals used in the environment in which the automatic equipment operates may inadvertently operate the "hard stop" or "soft stop" controls of the system. In addition, digital encoding allows the use of different transmitting and receiving units operating on the same frequency within the same manufacturing facility operating different control systems for different items of equipment.

Upon receipt of the appropriate RF signal, the receiver 50 supplies power to the operating coils of either a relay 52 or a relay 55. The relay 52 comprises an operating coil 53 associated with contacts 54. One side of the relay contacts 54 is connected to the first power supply line 40 through the fuse 46. The other side of the relay contacts 54 is connected to the operating coil of a momentary contact relay 58 having an operating coil 59 and contacts 60 and 61. The relay contacts 60 are normally open. One side of the relay contacts 60 is connected to the first power supply line 40 through a "hard stop" indicator light 62. The other side of the relay contacts 60 is connected to the second power supply line 41. When the main selector switch is in either the "test" or "on" mode so that the first supply line 40 is connected to the power line $L_1$, the indicator light 62 is illuminated when the relay operating coil 59 is energized and the relay contacts 60 are closed.

The relay contacts 61 are normally closed and are connected on one side to the line $H_1$ and on the other side to the line $H_2$. The lines $H_1$ and $H_2$ are connected to the "hard stop" control of the automated equipment. As long as a closed circuit is provided between the lines $H_1$ and $H_2$ the automated equipment operates normally. When an open circuit is provided between the lines $H_1$ and $H_2$, a "hard stop" is activated and the automated equipment is stopped by deactivating the program and disconnecting the power to the various drive functions. In most cases, the program is also lost from the memory. The sixth pole 38 of the main selector switch 32 is also connected between the lines $H_1$ and $H_2$. The sixth pole 38 is closed when the main selector switch 32 is in the "test" mode or in the "off" mode. Since the sixth pole 38 provides a closed circuit between the lines $H_1$ and $H_2$ when the main selector switch is in the "test" mode and the "off" mode, the opening of the relay contacts 61 by the energizing of the relay operating coil 59 has no effect in activating a "hard stop" when the main selector switch 32 is in either of these modes. However, when the main selector switch 32 is in the "on" mode, the sixth pole 38 is open and the lines $H_1$ and $H_2$ are connected to each other only through the relay contacts 61, so that when the relay operating coil 59 is energized and the contacts 61 are open, the lines $H_1$ and $H_2$ are disconnected from each other and a "hard stop" is activated.

The other relay 55 associated with the receiver 50 has an operating coil 56 and contacts 57. The relay operating coil 56 is connected to the receiver 50. One side of the relay contacts 57 are connected to the first power supply line 40 through the fuse 46. The other side of the relay contacts 57 is connected to one side of the operating coil of a relay 63 having an operating coil 64 and contacts 65 and 66. The relay 63 is a latching relay, the relay operating coil 64 serving to move the relay contacts 65 and 66 between an open and a closed position upon being energized and de-energized. Therefore, the relay contacts 65 and 66 are only moved from one position to the other when the relay operating coil 64 is energized and do not return to their previous position upon de-energizing of the coil 64.

The other side of the relay operating coil 64 is connected to the second power supply line 41 through the relay contacts 65. Thus, when the relay operating coil 64 is energized, the relay contacts 65 which connect the coil 64 with the second power supply line 41 open and the coil 64 is immediately de-energized. Since the relay 63 is a latching relay, the contacts 65 remain in this open position until the relay operating coil 64 is re-energized.

A "soft stop" indicator light 68 is connected between the first power supply line 40 and one side of the relay contacts 65. When the relay operating coil 64 is energized to move the relay contacts 65, the indicator light 68 is illuminated.

The relay contacts 66 are initially closed. One side of the relay contacts 66 is connected to the line $S_1$ and the other side of the contacts 66 to the line $S_2$. The lines $S_1$ and $S_2$ are connected to the "soft stop" or "cycle hold" inputs of the master control panel for the automated equipment. As long as a closed circuit is provided between the lines $S_1$ and $S_2$, the automated equipment operates normally. When an open circuit is provided between the lines $S_1$ and $S_2$, a "soft stop" or "cycle hold" is executed and the automated equipment stops all further motion but holds in the position in which it was when the circuit was open. The program is also retained in the memory of the automated equipment. When a closed circuit is restored and the lines $S_1$ and $S_2$ are connected to each other once again, the automated equipment resumes its normal operating cycle at the point at which it was interupted. The lines $S_1$ and $S_2$ are also connected to each other through the fifth pole 37 of the main selector switch 32. The fifth pole 37 is closed when the main selector switch 32 is in the "off" mode or the "test" mode and is open when the main selector 32 is in the "on" mode. Thus, when the main selector switch 32 is in the "off" mode or the "test" mode, the lines $S_1$ and $S_2$ are always connected to each other so that no "soft stop" or "cycle hold" is executed. When the main selector switch 32 is in the "on" mode, the pole 37 is open and the lines $S_1$ and $S_2$ are connected to each other only through the normally closed relay contacts 66. When the relay operating coil 64 is energized to open the relay contacts 66, the lines $S_1$ and $S_2$ are disconnected from each other and a "soft stop" or "cycle hold" is executed. Since the relay contacts 65 and 66 operate together, the indicator light 68 is illuminated whenever the contact 66 is opened.

Since the relay 63 is a latching relay and since one side of the relay operating coil 64 is connected through the relay contacts 65, the relay contacts 65 and 66 cannot be moved back to their normal position by energizing the relay operating coil 56 and closing the contacts 57. In order to reset the latching relay 64 a reset switch 70 is provided. The reset switch 70 is preferably a double-pole push button switch. The first pole 71 of the switch 70 is connected between one side of the relay operating coil 64 and the second power supply line 41. The second pole 72 of the reset switch 70 is connected between the other side of the relay operating coil 64 and the first power supply line 40. After the relay operating coil 64, has been energized to move the relay contacts 65 and 66, the reset switch 70 may be activated to supply power to the operating coil 64 to return the contacts 65 and 66 to their initial position as shown in FIG. 3.

Thus the relay contacts 65 and 66 are initially moved by energizing the relay operating coil 56 and closing the contacts 57 to energize the operating coil 64. The relay contacts 65 and 66 are returned to their initial position by activating the reset switch 70 to reenergize the operating coil 64.

In many instances, it is convenient for the technician or operator to cycle the "soft stop" on and off to jog the automated equipment. If it is necessary for the operator or technician to return to the master control panel to push the reset switch 70 cycling of the "soft stop" is inconvenient. Therefore, an override switch 74 is provided. The override switch is a doublepole switch having poles 75 and 76. The second pole 76, of the override switch 74 is connected on one side between the reset switch 70 and the operating coil 64 and is connected on the other side to the second power supply line 41. The first pole 75 of the override switch 74 is connected to the fourth pole 36 of the main selector switch 32 through an "override" indicator light 77 and is connected on the other side to the second power supply 41. When the override switch 74 is closed, the indicator light 77 is illuminated as long as the fourth pole 36 of the main selector switch 32 is closed and the first power supply line 40 is connected to the line $L_1$. Thus the indicator light 77 is illuminated when the main selector switch 32 is in the "on" mode and the override switch 74 is closed. When the override switch 74 is closed, the second pole 76 connects one side of the relay operating coil 64 to the second power supply line 41. Thus the relay operating coil 64 is no longer dependent upon connection to the second power supply line 41 through the relay contacts 65. With the override switch 74 closed, when the relay operating coil 64 is energized, it moves the relay contacts 65 and 66 as before. When the relay operating coil 64 is re-energized, it moves the relay contacts 65 and 66 back to their initial position. Thus the latching relay 63 operates in a cyclicable manner in which each energizing of the relay operating coil 64 moves the relay contacts 65 and 66.

In the operation of the control system of the present invention, there are three modes, depending upon the position of the main selector switch 32. With the main selector switch 32 in the "off" mode, the first and second poles 33 and 34 are open so that the first power supply line 40 is not connected to the power line $L_1$. The fifth and sixth poles 37 and 38 are closed so that the lines $H_1$ and $H_2$ and the lines $S_1$ and $S_2$ are always connected to each other.

When the main selector switch 32 is moved to the "test" mode, the first, third and sixth poles 33, 35 and 38 are closed. The first power supply line 40 is connected to the line $L_1$ through the first pole 33 of the main selector switch 32. Since the third pole 35 of the main selector switch 32 is closed, the "test" indicator light 43 is illuminated. When the receiver 50 receives a "hard stop" signal, it energizes the relay operating coil 53 to close the relay contacts 54 and energize the operating coil 59. When the relay operating coil 59 is energized, the normally open relay contacts 60 are closed and the normally closed relay contacts 61 are open. The "hard stop" indicator light 62 is illuminated when the relay contacts 60 are closed. The opening of the relay contacts 61 has no effect on the hard stop lines $H_1$ and $H_2$ since they remain connected to each other through the closed sixth pole 38 of the main selector switch 32. When a "soft stop" signal is received by the receiver 50, it energizes the relay operating coil 56 a to close the relay contacts 57 and energize the relay operating coil 64. The relay operating coil 64 moves the relay contacts 65 and 66 from their initial position. The movement of the relay contacts 65 disconnects the relay operating coil 64 from the second power supply line 41 and connects the "soft stop" indicator light 68 to the second power supply line 41 so that the light 68 is illuminated. The relay contacts 66 are opened so that that soft stop control lines $S_1$ and $S_2$ are disconnected from each other.

When the main selector switch 32 is in the "on" position the second and fourth poles 34 and 36 of the main selector switch 32 are closed and the other poles are open. The first power supply line 40 is connected to the power line $L_1$ through the second pole 34 of the main selector switch 32. The "on" indicator light 44 is illuminated since the fourth pole 36 of the main selector switch 32 is closed. When the receiver 50 receives a "hard stop" signal it activates the operating coil 53 to close the relay contacts 54 and energize the coil 59. Energizing the relay operating coil 59 closes the relay contacts 60 to illuminate the "hard stop" indicator light 62 and opens the relay contacts 61. With the relay contacts 61 open and the sixth pole 38 of the main selector switch 32 open, the lines $H_1$ and $H_2$ are disconnected from each other and a hard stop is executed. When a "soft stop" signal is received by the receiver 50, it energizes the relay operating coil 56 to close the relay contacts 57 and energize the relay operating coil 64. When the relay operating coil 64 is energized it moves the relay contacts 65 and 66 from their initial position. The moving of the relay contacts 65 disconnects the relay operating coil 64 from the second power supply line 41 and connects the "soft stop" indicator light 68 to the power supply line 41 to illuminate the light 68. The relay contacts 66 open, and since the fifth pole 37 of the main selector switch 32 is open, the lines $S_1$ and $S_2$ are disconnected from each other and a soft stop is executed.

To reset the latching relay 63 in either "test" or "on" modes, the reset switch 70 is activated to connect one side of the relay, operating coil 64 to the first power supply line 40 and the other side of the coil 64 to the second power supply line 41.

To operate the latching relay 63 in a cyclicable mode, the override switch 74 is closed. When the main selector switch 32 is in the "on" mode and the fourth pole 36 of the switch is closed, the "override" indicator light 77 is illuminated when the switch 74 is closed. The override switch 74 operates to place the latching relay 63 on a cyclicable mode in either the "on" or "test" modes, but the indicator light 77 is illuminated in only the "on" mode. When the switch 74 is closed, one side of the relay operating coil 64 is connected at all times to the second power supply line 41 so that the latching relay 63 operates upon each closing of the contact 57, which closing connects the other side of the relay operating coil 64 to the first power supply line 40.

In the form of the invention shown in FIG. 3, the "soft stop" or "cycle hold" control lines $S_1$ and $S_2$ and the "hard stop" control lines $H_1$ and $H_2$ are normally closed, so that the "soft stop" or "hard stop" commands are executed when the respective lines are opened or disconnected from each other. In some automated equipment, the control lines $S_1$ and $S_2$ and the control lines $H_1$ and $H_2$ are normally open, and the appropriate commands are executed when the respective lines are closed or connected to each other. The main control unit 30 is also capable of use with such equipment. To use the control unit 30 with normally open control lines, the connections between the control lines $S_1$, $S_2$, $H_1$ and $H_2$ and the relay contacts 61 and 66 and the fifth and sixth poles 37 and 38 of the main selector switch 32 are changed, as shown in the control unit 30a in FIG. 4, from a shunt to a series connection.

Figure 4:
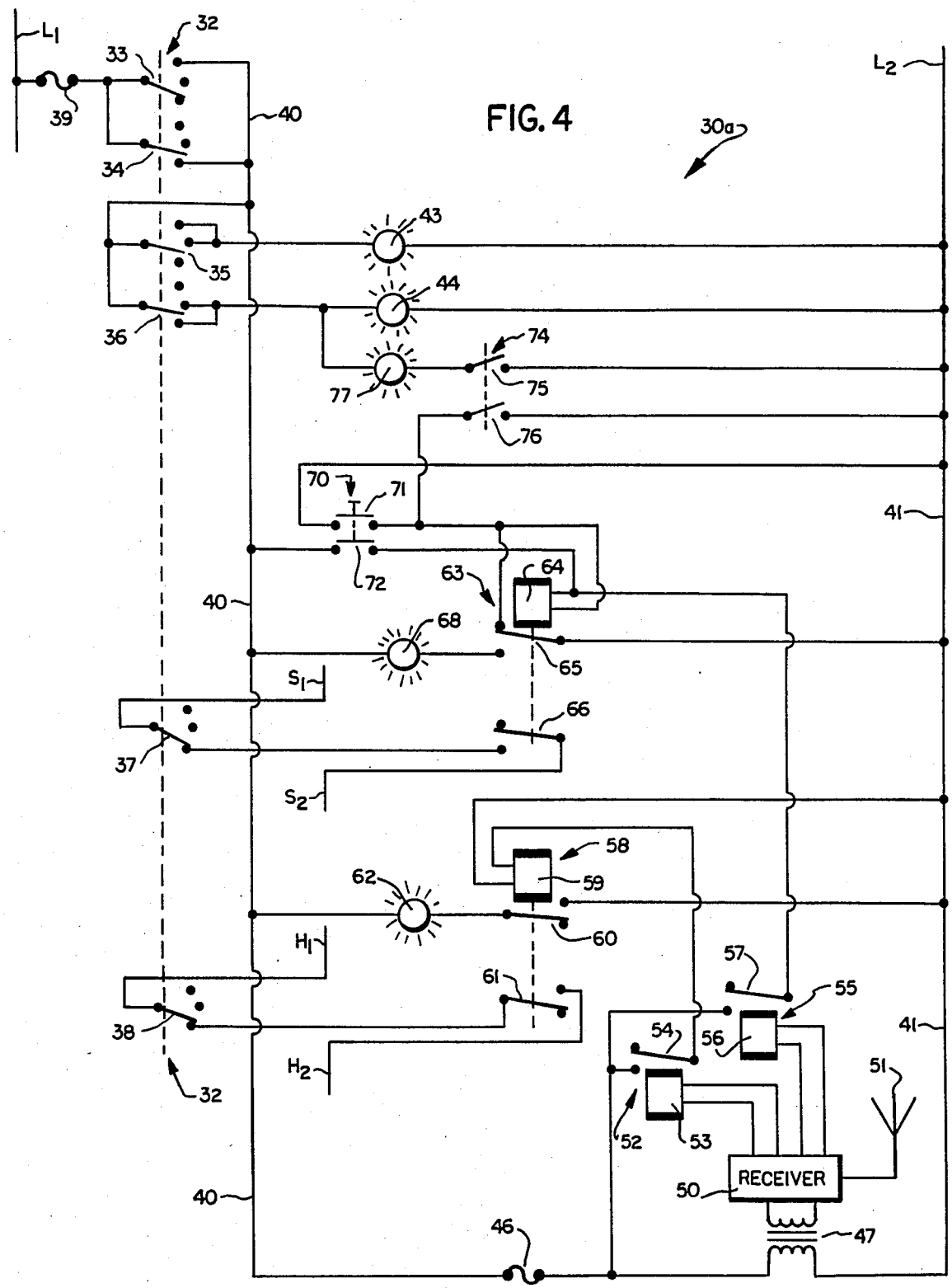
FIG. 4 is an electrical schematic of the main control system similar to FIG. 3 showing an alternative embodiment of the present invention.

In FIG. 4, the control line $S_1$ is connected only to the fifth pole 37 of the main selector switch 32, and the control line $S_2$ is connected only to the relay contact 66. Likewise the control line $H_1$ is connected only to the sixth pole 38 of the main selector switch, the control line $H_2$ is connected only to the relay contact 61. The other elements of the control unit 30a of FIG. 4 are the same as those of the control unit 30 of FIG. 3.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A control unit for automated equipment having hard stop and soft stop controls comprising:
    an RF receiver capable of receiving two different RF signals from a transmitter;
    a momentary contact relay means comprising a first relay operator and first relay contacts, the first relay operator connected to the receiver to be energized in response to the receipt of one of the two RF signals, the first relay contacts connected to the hard stop control of the automated equipment;
    a latch relay means comprising a second relay operator and a second relay contacts, the second relay operator connected to the receiver to be energized in response to the receipt of the other of the two RF signals, the second relay contacts connected to the soft stop control of the automated equipment, the second relay operator connected to the second relay contacts to disable the second relay operator after it has been energized;
    reset switch means connected to the second relay operator to energize the second relay operator independently of the receiver; and
    override switch means connected to the second relay operator to permit the second relay operator to be reenergized in response to the receipt of said other of the two RF signals.

2. A control unit as defined in claim 1 comprising in addition test switch means for deactivating the automated equipment controls from the first and second relay contacts.

3. A control unit as defined in claim 1 comprising in addition indicator lights connected to the first and second relay contacts for indicating the energizing of the first and second relay operators.

4. A remote control system for automated equipment having hard stop and soft stop controls comprising:
    a portable RF transmitter capable of selectively sending two different RF signals;
    an RF receiver capable of receiving the two different RF signals from the transmitter;
    a momentary contact relay means comprises a first relay operator and first relay contacts, the first relay operator having two terminals, one of the terminals of the first relay operator being connected to the receiver to be energized in response to the receipt of one of the two RF signals, the first relay contacts connected to the hard stop control of the automated equipment;
    a latch relay means comprising a second relay operator and second relay contacts, the second relay operator having first and second terminals, the first terminal of the second relay operator connected to the receiver to be energized in response to the receipt of the other of the two RF signals, the relay contacts connected to the soft stop control of the automated equipment, the second terminal of the second relay operator connected to the second relay contacts to disable the second relay operator after it has been energized;
    reset switch means connected to both terminals of the second relay operator to energize the second relay operator independently of the receiver and the second relay contacts; and
    override switch means connected to the second terminal of the second relay operator to permit the second relay operator to be re-energized in response to the receipt of said other of the two RF signals.

5. A remote control system as defined in claim 4 comprising in addition test switch means for deactivating the automated equipment controls from the first and second relay contacts.

6. A remote control system as defined in claim 4 comprising in addition indicator lights connected to the first and second relay contacts for indicating the energizing of the first and second relay operators.

7. An automated equipment control system comprising:

a power supply system having first and second power supply lines;

an automated equipment having controls for a recyclicable soft stop and a final hard stop;

a portable transmitter unit adapted to be carried by a technician when programming the automatic equipment, the transmitter unit having a transmitter capable of sending two different RF signals, the transmitter unit also having a portable electric power supply; and a control unit connected to the automatic equipment and to the power supply system, the control unit including an RF receiver capable of receiving the two different RF signals from the transmitter, the control unit also including a momentary contact relay means having a first relay operator and first relay contacts, the first relay operator having first and second terminals, the first terminal of the first relay operator being connected to the first power supply line through the receiver and the second terminal of the first relay operator being connected to the second power supply line to be energized in response to the receipt of one of the two RF signals by the receiver, the first relay contacts being connected to the hard stop control of the automated equipment, the control unit also including a latch relay means having a second relay operator and second relay contacts, the second relay operator having first and second terminals, the first terminal of the second relay operator connected to the first power supply line through the receiver to be energized in response to the receipt of the other of the two RF signals, the second relay contacts being connected to the soft stop control of the automated equipment, the second terminal of the second relay operator connected to the second power supply line through the second relay contacts to disable the second relay operator after it has been energized.

8. An automated equipment control system as defined in claim 7 wherein the control unit includes in addition reset switch means connected to both terminals of the second relay operator and to both the first and second power supply lines to energize the second relay operator independently of the receiver and the second relay contacts.

9. An automated equipment control system as defined in claim 7 wherein the control unit includes in addition override switch means connected between the second terminal of the second relay operator and the second power supply line to permit the second relay operator to be energized in response to the receipt of said other of the two RF signals.

10. An automated equipment control system as defined in claim 7 wherein the control unit includes in addition test switch means for disconnecting the controls of the automated equipment from the first and second relay contacts.

11. An automated equipment control system as defined in claim 7 wherein the control unit includes in addition indicator lights connected to the first and second relay contacts for indicating the energizing of the first and second relay operators.

* * * * *